Dec. 30, 1924.
W. R. GREEN
ATTACHING BRACKET FOR TIRE CARRIERS
Filed Feb. 1, 1922
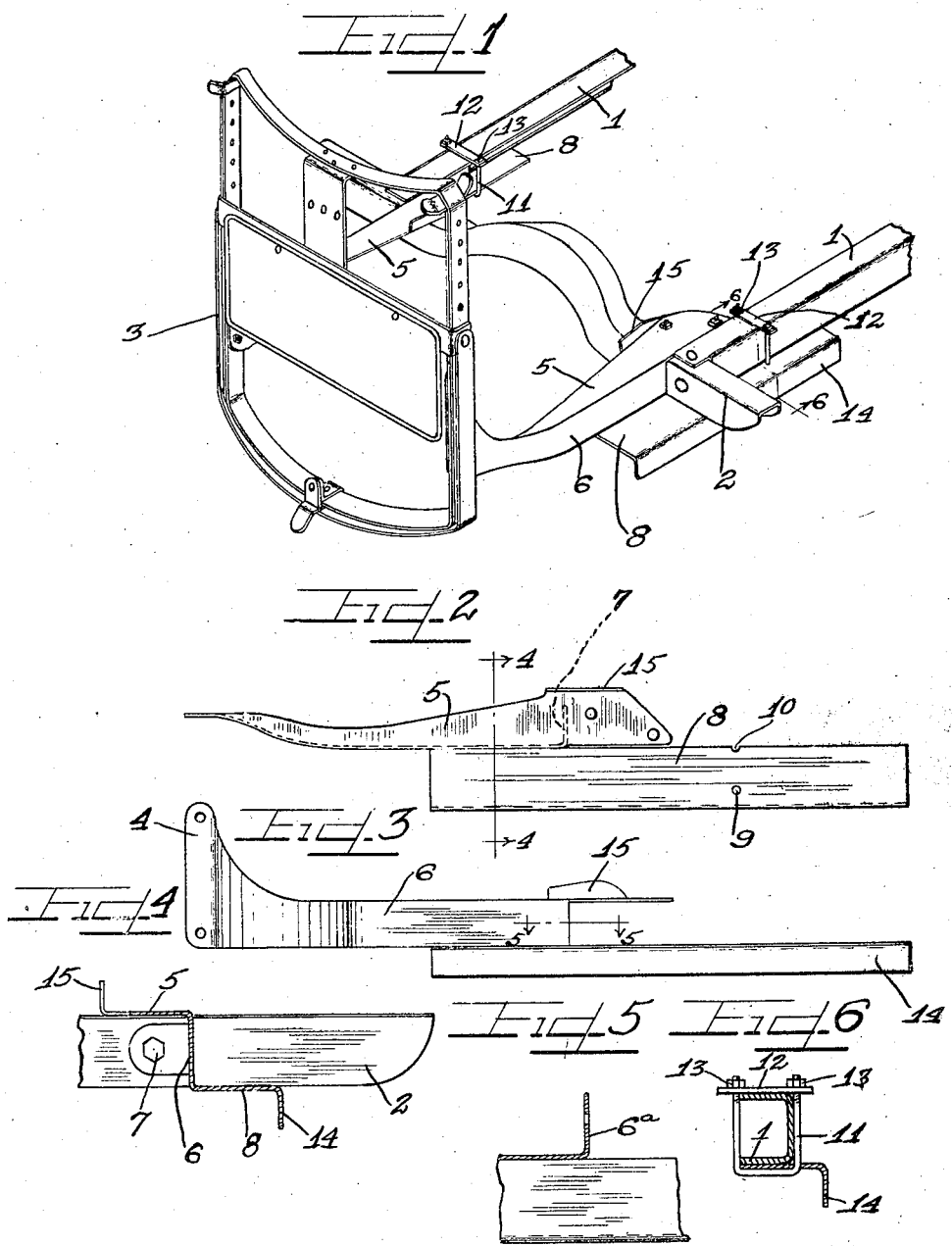

Patented Dec. 30, 1924.

1,520,816

UNITED STATES PATENT OFFICE.

WALTER R. GREEN, OF CHICAGO, ILLINOIS.

ATTACHING BRACKET FOR TIRE CARRIERS.

Application filed February 1, 1922. Serial No. 533,207.

*To all whom it may concern:*

Be it known that I, WALTER R. GREEN, a citizen of the United States, and a resident of the city of Chicago, in the county of Cook and State of Illinois, have invented certain new and useful Improvements in an Attaching Bracket for Tire Carriers; and I do hereby declare that the following is a full, clear, and exact description of the same, reference being had to the accompanying drawings, and to the numerals of reference marked thereon, which form a part of this specification.

This invention relates to an attaching bracket for tire carriers, and it is an object of this invention to provide a bracket that will effectively resist the shear and bending movements produced by the carrier; that will be rigid and durable when attached to the chassis of a vehicle, and prevent sagging and loosening of the carrier with respect to the chassis.

With these and other objects in view which will become more apparent in the following description and disclosure in the drawing, this invention comprises the novel mechanism and combinations hereinafter described and more particularly pointed out and defined in the appended claims.

In the accompanying drawings which illustrate a preferred embodiment of this invention and in which similar reference numerals refer to similar features in the different views:

Figure 1 is a fragmentary view in perspective of an automobile chassis with a tire carrier attached thereto by my novel form of brackets.

Figure 2 is a top plan view of the detached bracket upon an enlarged scale.

Figure 3 is a side elevational view of the detached bracket upon an enlarged scale.

Figure 4 is a section on the line 4—4 of Figure 2 upon an enlarged scale.

Figure 5 is a section on the line 5—5 of Figure 2 upon an enlarged scale.

Figure 6 is a section on the line 6—6 of Figure 1 upon an enlarged scale.

In referring now to the drawings, it will be noted that Figure 1 illustrates a rear portion of the chassis of an automobile comprising the side sills 1 which are in the form of channels and the transverse member 2. The tire carrier 3 is adapted to be supported on the chassis by my novel attaching brackets, one on each side of the carrier; the tire carrier being preferably of such a form as to provide suitable sides to which the brackets may be readily attached.

As the two supporting brackets for the tire carrier are substantially similar except that one is of opposite hand to the other, only one will be described. The brackets are preferably stamped from sheet metal, the right hand one which is shown having a rear foot portion 4 adapted to be attached to the carrier at a plurality of spaced points so as to resist the tendency of the carrier to oscillate in a vertical plane. The upper surface of the bracket consists of a forwardly diverging or flaring horizontal flange 5 adapted to rest upon and be attached to the transverse member 2 or a gusset thereon. The said horizontal flange merges into a downwardly extending side flange or web 6 which extends contiguous to the transverse member 2 where it is provided with a lateral wing in the form of an angle clip 7 attached to the transverse member 2 by means of bolts or the like. The side flange 6 merges into a lower horizontal flange 8 at an intermediate point; the lower horizontal flange extending forwardly under the transverse member 2 and sill 1, whereby a form of Z bar is produced. Forwardly of the transverse member 2 the lower horizontal flange 8 is provided with an aperture 9 and a lateral notch 10 through which a U bolt or stirrup 11 passes which straddles the side sill and is clamped thereto by a bridging strip 12 and nuts 13, whereby the lower horizontal flange is firmly clamped to the side sill. The outer margin of the lower flange 8 may be bent downwardly to provide a strengthening and stiffening flange 14, and the forward end of the upper horizontal flange may be provided with a strengthening and stiffening flange 15 and the rear portion of the bracket may be curved or bent inwardly according to the required width of the carrier.

It will be noted that the novel form of attaching bracket embraces both the top and bottom of the chassis and is laterally braced in respect thereto by the attaching angle 7 whereby a strong durable and rigid support for the carrier is provided which prevents the same from sagging, or oscillating and working loose from its support, as has been so common in former tire carriers.

It will be noted that the form of bracket illustrated is designed with reference to the chassis of a Ford automobile upon which the carrier is subjected to a great deal of vibration and from which it will soon wear loose unless firmly supported and braced.

I am aware that numerous details of construction may be varied through a wide range without departing from the principles of this invention and I therefore do not purpose limiting the patent granted otherwise than necessitated by the prior art.

I claim as my invention:

1. An attaching bracket for a tire carrier comprising a member having a web, a flange extending from one side from the upper end of said web, and extending therebeyond and adapted for attachment to the top of a transverse member of the chassis, a flange extending from the lower and opposite side of said web and adapted for attachment to the bottom of a longitudinal sill of the chassis and a lateral wing extending from said web for attachment to the transverse member of the chassis.

2. An attaching bracket for a tire carrier comprising a member having a vertical web with oppositely extending spaced and parallel flanges adapted for embracing upper and lower parts of the chassis and said web having a laterally extending wing for the purpose set forth.

3. An attaching bracket for a tire carrier comprising a member having a web with oppositely extending, parallel and spaced flanges adapted for attachment to the top and bottom of the chassis of a vehicle.

In testimony whereof I have hereunto subscribed my name in the presence of two subscribing witnesses.

WALTER R. GREEN.

Witnesses:
CARLTON HILL,
JAMES N. O'BRIEN.